Dec. 22, 1959   H. E. LAWSON   2,918,515
DELAYED ACTION BATTERY
Filed June 24, 1944
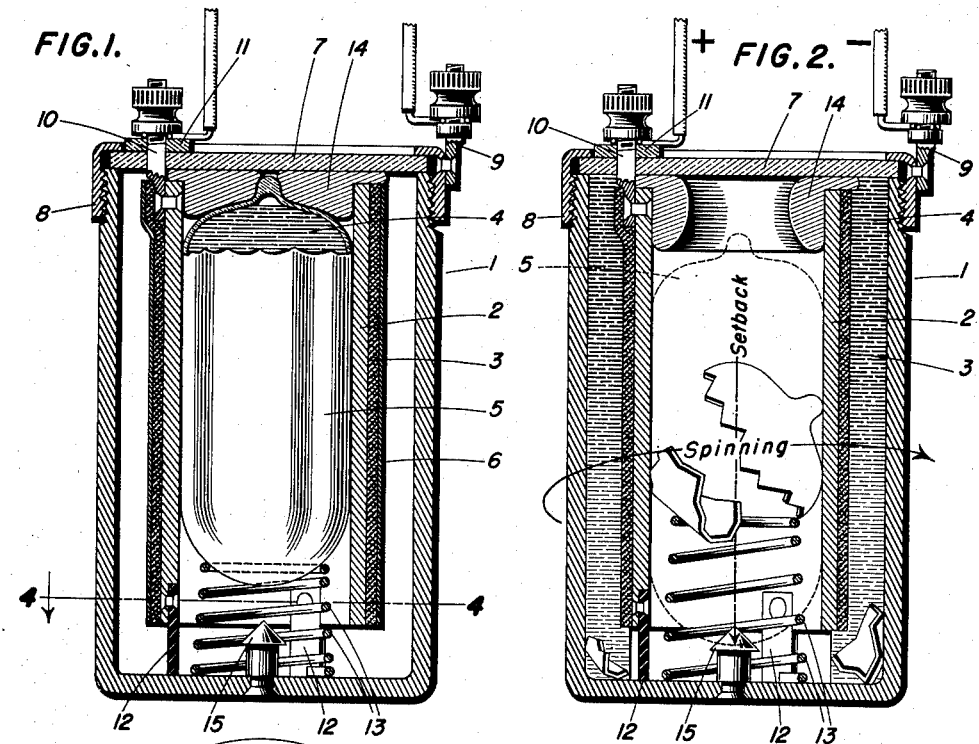
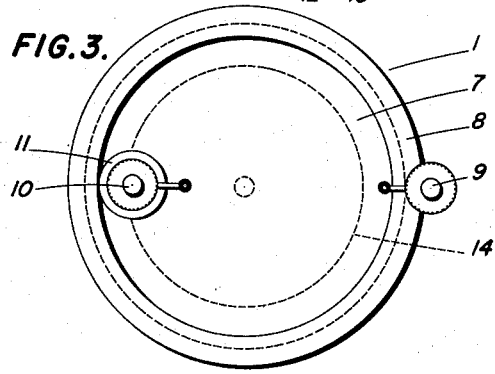
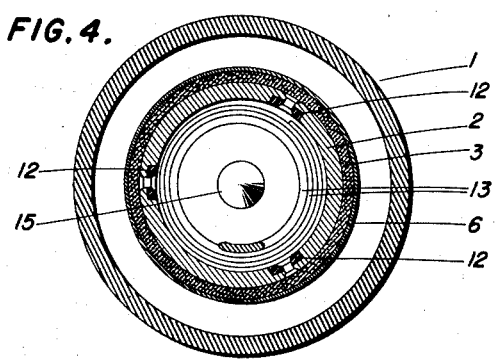
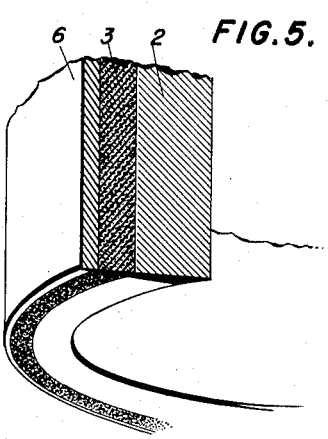
INVENTOR
HERBERT E. LAWSON
BY
ATTORNEY United States Patent Office 2,918,515
Patented Dec. 22, 1959

2,918,515

DELAYED ACTION BATTERY

Herbert E. Lawson, Silver Spring, Md., assignor to the United States of America as represented by the Secretary of the Navy Application June 24, 1944, Serial No. 541,955

13 Claims. (Cl. 136—90)

This invention relates to electric batteries and has particular relation to an improved battery of the delayed action type.

A common form of the delayed action type galvanic cell is that known as the "reserve cell," wherein the galvanic elements are kept out of contact with the liquid electrolyte by having the electrolyte sealed in an ampoule until the cell is to be put into service. This feature of the battery whereby activation of the battery is deferred for future use makes possible a very long shelf life for the cell. For certain uses of galvanic batteries, particularly batteries of the delayed action type, it is desirable and necessary that the electrical circuit remain unenergized for a definite period of time after the cell has been put in operation. One such use is for electrically operated projectile fuzes where it is necessary, to insure safety, that the electrical circuit to the squib remain unenergized until the projectile has cleared the gun barrel and has been projected a sufficient distance from the gun. When a delayed action battery is employed in the projectile, the ampoule containing the electrolyte is ordinarily broken to release the electrolyte at the instant the gun is fired, thus activating the battery so that a supply of electrical energy is available for firing the squib. Up to the present time, mechanically operated devices and various electrical circuits have been used for the purpose of delaying the discharge of the electrical energy from the activated battery. However, these devices and circuits have not proven infallible or entirely dependable, with the result that premature detonations have occurred. Another objection to former devices and circuits is that they occupy considerable space, which is undesirable because space is at a premium in a projectile. A further objection is that former devices and circuits involve a number of production difficulties including time, materials and expense.

One of the objects of the present invention is to provide an improved method for delaying activation of an electric battery for a predetermined period of time.

Another object of the invention is to provide an improved delayed action battery which is so constructed that it will not become activated, that is, will not deliver an appreciable voltage, until after the passage of a predetermined time interval.

A further object is to provide a delayed action battery which, although well adapted for use in electrically operated projectiles, is also particularly well suited for supplying energy to any electrical circuit requiring delayed action energization.

A still further object is to provide a delayed action battery, the time of activation of which may be predetermined to satisfy a given condition.

Still another object is to provide a delayed action battery characterized by extreme simplicity in construction; ruggedness and positiveness in operation.

The present invention broadly comprises the formation of a delayed action battery by coating an electrode of the cell with a layer of predetermined thickness of a material which is capable of being dissolved by the electrolyte of the cell within a predetermined period of time. In a preferred form, the invention generally comprises the formation of a delayed action battery by plating the cathode of the cell with a predetermined thickness of the metal forming the anode, thereby causing both of the electrodes to have the same potential when they are initially contacted by an electrolyte. After the passage of a predetermined length of time, which varies with the thickness of the anode metal coating on the cathode, the electrolyte removes the coating from the cathode by local action, thereby permitting activation of the battery.

These and other objects will be understood by reference to the accompanying drawing and description which illustrate and describe a preferred embodiment of the present invention. In the drawing:

Fig. 1 is a vertical sectional view of a reserve battery embodying a preferred form of the delayed action features, as it appears in the unactivated or safe condition;

Fig. 2 is a vertical sectional view showing the battery of Fig. 1 in a completely activated condition;

Fig. 3 is a top plan view of the battery of Fig. 1;

Fig. 4 is a plan view in section, taken on the line 4—4 of Fig. 1, and

Fig. 5 is a detailed sectional fragmentary view of the cathode element as shown in Fig. 1.

For the sake of simplicity, only an "A" cell of the delayed action battery is shown in the drawing. However, it will be understood that both "A" and "B" cell electrodes may be formed in accordance with the present invention so as to provide delayed activation.

Referring to the drawing, the anode 1 of the battery is composed of zinc and provides a cylindrical container for the battery. The cathode 2 is in the form of a sleeve or cylinder, preferably of steel, concentrically positioned within the anode 1 and provided with an outer coating layer of carbon 3 so as to furnish a cathodic electrode to cooperate with the zinc anode. The electrolyte 4 which may be a solution of chromic acid and stannic chloride in water is contained in a sealed ampoule 5 made of glass or other frangible material, such as plastic, which is normally positioned axially within the cathode element 2.

In order to provide delayed activation, I deposit on the carbon cathode layer 3 as by means of an electroplating process, a coating layer 6 of the anode metal, which is zinc in the example shown. This coating is preferably deposited before assembling the cathode in the cell, by placing the cathode element in a cyanide bath, although it is possible to coat the cathode after it is assembled in the cell. However, it has been found that better control of the quality and thickness of the plating and better washing thereof is obtained if the cathode element is coated prior to assembly of the cell. The thickness of the anode metal coating layer 6 on the cathode may be varied in accordance with the period of time of delayed activation desired.

An insulating disc or cover plate 7 of dielectric material is adapted to cover the open end of the anode container 1 and is secured thereto by an internally threaded flanged retaining ring 8 which is fashioned to retain the cover plate in place. The open end portion of the zinc container 1 is externally threaded, and the ring 8 is screwed on the threaded portion of the container so as to provide a means for tightly securing the cover plate 7 in place. The ring 8 is formed of the zinc anode metal in order to provide a current outlet to the negative terminal 9 which is riveted to the ring. The positive terminal 10 is riveted to the steel cylinder 2 and contacts the carbon cathodic coating 3. The terminal 10 passes through an opening in the cover plate 7, and a plastic washer 11 is provided to seal the opening.

The cylinder 2 is provided with leg supports 12 which are formed of a suitable insulating material so as to prevent short circuiting of the cell. The sealed ampoule 5 is fashioned to utilize the maximum available space within the cylinder 2 and to fit snugly against the inner side of the cylinder to prevent accidental breakage thereof. The base of the ampoule is hemispherical in shape and rests upon the circular end coil of a spring 13 which is held in a compressed state between the ampoule and the bottom of the container 1. The top of the ampoule is pushed against a pliable cushion 14 by the force of the compressed spring 13. Thus, the ampoule 5 is securely held in place by a snug fit along its sides with the cylinder 2, by the spring 13 and the packing 14. A puncturing element 15, shown in the form of a tapered stem, is mounted axially at the base of the container 1 and extends along the axis of the coil spring 13.

It will be understood that various modifications may be made in the invention, which is illustrated by a preferred embodiment. The invention may be used to advantage in the type of battery disclosed by copending patent application Serial No. 507,168, filed October 21, 1943, by Lewis M. Mott-Smith.

The manner of operation in one use of the new battery is as follows: The battery is first assembled in a projectile and is electrically connected with the components of an electrically operated fuze. When the projectile is fired, the initial force of setback resulting from acceleration imparted to the projectile, drives the ampoule 5 downwardly, compressing the spring 13 which permits the ampoule to be punctured by the sharpened point of the element 15. Simultaneously, the packing 14 is forced into a doughnut shape, as illustrated in Fig. 2, by centrifugal force resulting from rotation of the projectile when it is fired from a rifled gun barrel. Upon puncturing the ampoule, the electrolyte 4 is driven outwardly from the center of the cylinder 2 by centrifugal force and downwardly by the force of setback. As a result, the electrolyte is forced outwardly under the lower end of cylinder 2 between the legs 12, and upwardly into the space between the anode container 1 and the layer 6. At this time, little or no voltage will be present at the output terminals for the reason that both electrodes have the same potential due to the outer layer 6 of anode metal coated on the carbon cathode 3. However, after the passage of a predetermined period of time, the electrolyte 4 removes by local action or dissolution a substantial portion of the zinc coating layer 6, thereby exposing the carbon cathode coating 3 to the electrolyte, with the result that the battery becomes activated and is capable of delivering electrical current. The delayed activation layer 6 is deposited evenly over the surface of the electrode 3, and the electrolyte 4 is normally disposed evenly over the major portion of the surfaces of both electrodes, so that the dissolution of the delayed activation layer is substantially uniform, thereby insuring that full activation of the battery takes place.

In one example, the carbon cathode 3 was plated with approximately .02 mil thickness of zinc layer 6, and an electrolyte 4 comprising chromic acid, stannic chloride and water was used. Complete activation was obtained in 14 seconds at a temperature of —20° F., in 5 seconds at 80° F. in 4 seconds at 120° F. In each instance, the battery delivered its full rated voltage of 1.6 volts at complete activation.

It will be apparent that by coating the electrode with a layer which is capable of being dissolved by the electrolyte, it is possible to assure that no substantial voltage will be present at the output terminals of the battery until after the passage of a predetermined period of time, during which the delayed activation layer is dissolved by the electrolyte. The length of time required to dissolve the delayed activation coating is determined by its thickness, which may be varied in accordance with the desired time of delayed activation. The thickness of the coating may be altered by varying the length of time during which the cathode is exposed in the cyanide bath for electrodeposition of the zinc layer. It will be further understood that the invention includes the application, to either electrode of any cell of the battery, of any delayed activation coating layer which is capable of being dissolved by the electrolyte.

I claim:

1. A delayed action battery comprising a pair of electrodes, an electrolyte initially out of contact with said electrodes, means for moving said electrolyte into contact position with said electrodes, and a layer of material coated on one of said electrodes having initially substantially the same potential for preventing contact of said electrolyte with said one electrode, the coating layer being removable from said one electrode by the electrolyte after the passage of a predetermined period of time for activating the battery.

2. A delayed action battery comprising an anode, a cathode, a liquid electrolyte initially maintained out of contact with the anode and cathode, means for releasing said electrolyte into contact position with said anode and cathode, and a layer of material coated on said cathode for preventing contact of said electrolyte with the cathode, said anode and cathode having substantially the same potential when initially exposed to said electrolyte, and said coating layer being removable from the cathode by local action of the electrolyte after the passage of a predetermined period of time for activating the battery.

3. A delayed action battery comprising a liquid electrolyte, a metal anode, a cathode, means for exposing said anode and cathode to said electrolyte, a layer of anode metal coated on the cathode for preventing contact of said electrolyte with said cathode and for retaining the electrodes at substantially the same potential when initially exposed to said electrolyte, said coating layer being removable from the cathode by the electrolyte after the passage of a predetermined period of time for activating the battery.

4. A delayed action battery comprising a liquid electrolyte, a zinc anode, a carbon cathode, means maintaining said electrolyte out of activating relation with said anode and cathode, means for releasing said electrolyte, and a layer of zinc deposited on said carbon cathode for preventing instantaneous contact of said electrolyte with the carbon and for retaining said anode and cathode at substantially the same potential when initially exposed to said electrolyte, said zinc layer being removable by local action of the electrolyte after the passage of a predetermined period of time for activating the battery.

5. A delayed action battery comprising an electrolyte, a metal anode forming a container having an open end, a dielectric cover for sealing said open end, a carbon cathode positioned axially within said anode container, said electrolyte being initially out of contact with said anode and cathode, means for exposing said anode and cathode to said electrolyte, a layer of anode metal deposited on said carbon for preventing instantaneous contact of said electrolyte with the carbon and for retaining said anode and cathode at substantially the same potential when initially exposed to said electrolyte, said anode metal layer being removable by local action of the electrolyte after the passage of a predetermined period of time for activating the battery.

6. The delayed action battery of claim 5 in which the anode metal is zinc.

7. The delayed action battery of claim 5 including a sealed frangible ampoule initially containing the electrolyte and positioned axially within the cathode.

8. The delayed action battery of claim 5 in which the cathode is positioned concentrically within the anode.

9. In a delayed action electric battery having a metal anode and a cathode in assembled relation and a quantity of electrolyte to be introduced into the battery assembly to activate the battery, the process of delaying activation of the battery after introduction of the electrolyte, which comprise coating the cathode with a layer of the anode metal, whereby both electrodes will be at substantially the same potential when initially immersed in the electrolyte, and removing the anode metal layer from the cathode by local action of the electrolyte after the passage of a predetermined period of time for activating the battery.

10. In a deferred action battery, a pair of electrodes arranged in face to face relation, said electrodes being separated to provide a space for electrolyte between said electrodes, a supply of electrolyte normally maintained out of contact with said electrodes, means for releasing the electrolyte into said space, and a coating on one of said electrodes for inhibiting activation of said battery, said coating being soluble in said electrolyte whereby said electrolyte makes contact with said electrode to activate said battery a predetermined time interval after said electrolyte has filled the space between the electrodes.

11. In a deferred action battery, a pair of active electrodes, one of said electrodes being a zinc anode, said electrodes being separated to provide a space therebetween, a supply of electrolyte normally maintained out of contact with said electrodes, means for releasing the electrolyte into said space to activate said battery, and a thin coating of zinc on the surface of the cathode electrode for momentarily inhibiting activation of said battery after release of said electrolyte, said zinc coating being removable by chemical action of said electrolyte to effect activation of the battery a predetermined time interval after release of the electrolyte.

12. A delayed action battery comprising an anode forming a container having an open end, a cathode spaced within said anode, a cover of dielectric material sealing said open end, a quantity of electrolyte in said container initially out of contact with said anode and cathode, means for releasing said electrolyte into contact position with said anode and cathode, a coating of anode material on the surface of said cathode for preventing instantaneous contact of said electrolyte with said cathode for maintaining substantially no potential difference between said anode and cathode when initially exposed to said electrolyte, said coating being removable by action of the electrolyte for permitting activation of the battery by said electrolyte a predetermined period of time after release of the electrolyte.

13. A delayed action battery comprising a metal anode forming a container having an open end, an annular cathode in spaced insulated relation with respect to said container, an axial channel formed in said cathode, an ampoule of electrolyte in said channel, a cover sealing said container and securing said cathode in place, a breaker for releasing the electrolyte into proximity with said anode and cathode, a coating of anode metal on said cathode for maintaining a low potential difference between the anode and cathode during the immediate interval after release of the electrolyte, said coating of anode metal being removable by action of the electrolyte thereby permitting the electrolyte to activate the battery and provide normal operating potential between said anode and cathode a predetermined time interval after release of the electrolyte.

References Cited in the file of this patent

UNITED STATES PATENTS

| | | |
|---|---|---|
| 1,390,765 | Cox | Sept. 13, 1921 |
| 1,658,142 | Stamm | Feb. 7, 1928 |
| 1,856,386 | Heise | May 3, 1932 |
| 1,941,869 | Martus et al. | Jan. 2, 1934 |